United States Patent

Cupit

[15] 3,680,896
[45] Aug. 1, 1972

[54] TOILET PAN CONNECTOR
[72] Inventor: George Moffat Cupit, 77 Crockford St., Port Melbourne, Victoria, Australia
[22] Filed: July 22, 1969
[21] Appl. No.: 843,596

[30] Foreign Application Priority Data

July 30, 1968 Australia ................41398/69

[52] U.S. Cl. ...............285/177, 285/178, 285/224, 285/423
[51] Int. Cl. .............................................F16l 25/00
[58] Field of Search....285/177, 178, 12, 8, 224, 225, 285/423, 56–60, 252

[56] References Cited

UNITED STATES PATENTS

| | | | |
|---|---|---|---|
| 3,037,212 | 6/1962 | Kleinhof | 4/252 |
| 290,045 | 12/1883 | Hordy | 285/178 |
| 1,117,961 | 11/1914 | Phillips | 285/225 |
| 2,415,339 | 2/1947 | Curtis | 285/177 X |
| 2,649,271 | 8/1953 | Gosselin | 285/225 X |
| 1,984,347 | 12/1934 | Sutton et al. | 285/8 X |

FOREIGN PATENTS OR APPLICATIONS

| | | | |
|---|---|---|---|
| 589,978 | 1/1960 | Canada | 285/177 |
| 626,005 | 1/1936 | Germany | 285/177 |

Primary Examiner—Dave W. Arola
Attorney—Sommers & Young

[57] ABSTRACT

A connector for sealably joining the inlet, outlet or vent opening of a toilet pan to a pipe which includes large and small tubular portions with their axes substantially parallel, each of the tubular portions being adapted to receive a female sealing engagement, one of the components to be connected, and and an integrally formed non-planar diaphragm interconnecting the two tubular portions, the tubular portions and the diaphragm being composed of a resilient material and a diaphragm being sufficiently flexible to accommodate misalignments of the components to be connected.

4 Claims, 8 Drawing Figures

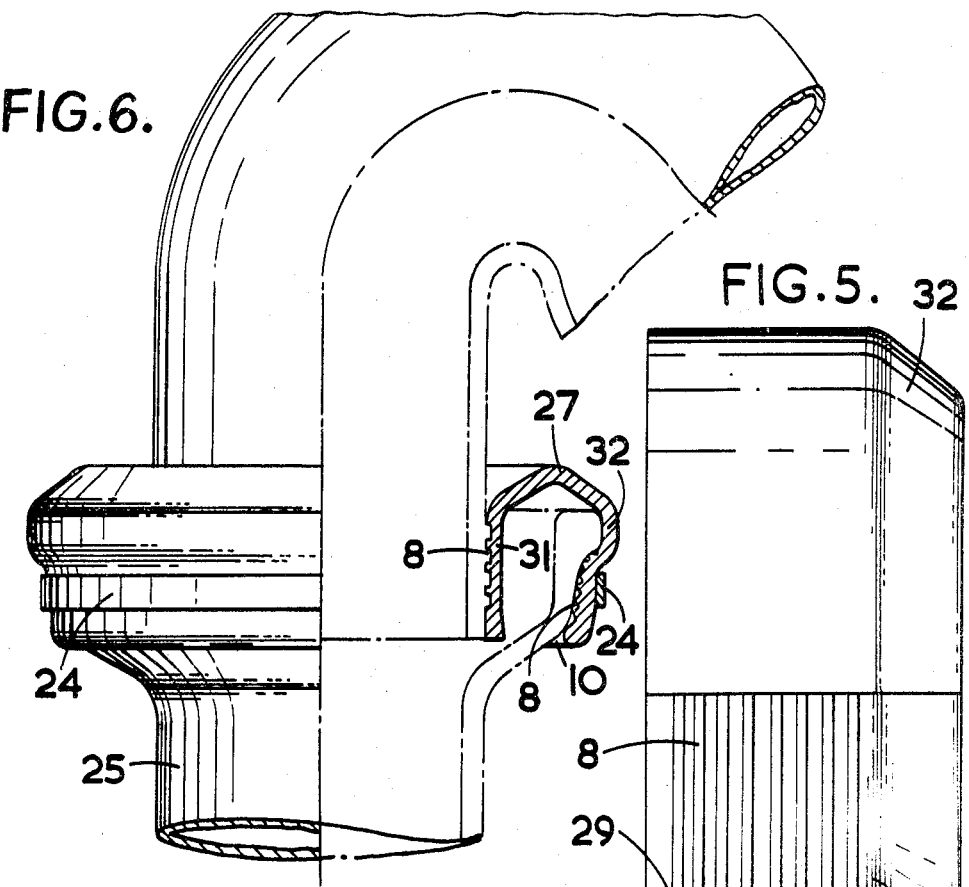
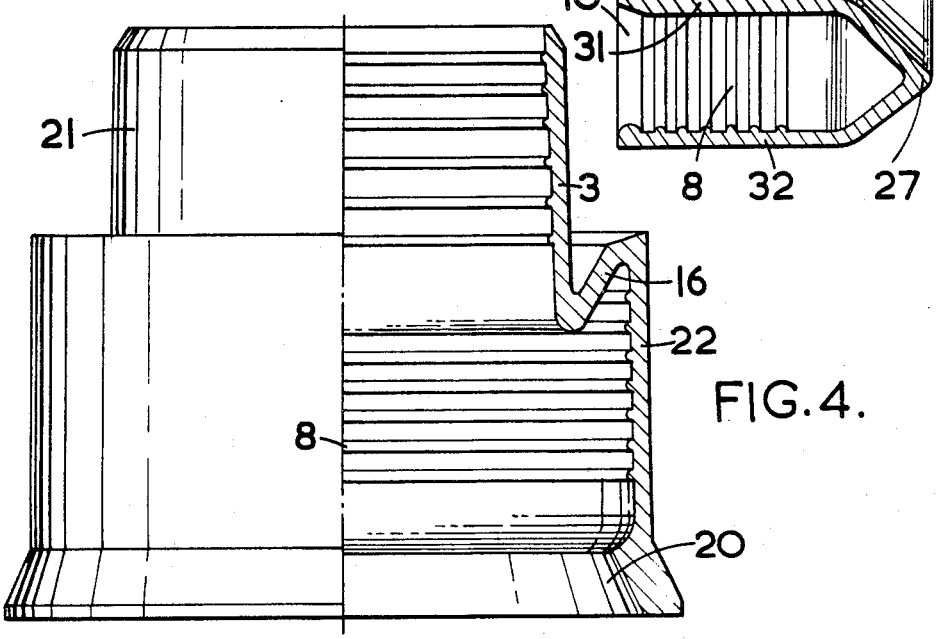

TOILET PAN CONNECTOR

This invention relates to a resilient toilet pan connector for connecting a pipe to the inlet, outlet or vent of a toilet pan.

At the "pan horn" which defines the pan inlet opening, a connection must be made to a flush pipe leading from the cistern, and at the outlet opening, a connection is made to the spigot of a soil pipe, usually composed of cast iron, earthen ware or plastic material. In addition, some toilet pans are provided with a trap vent or vent opening which must be connected to a vent pipe.

Connectors are known for connecting to the inlet or vent of a pan, and usually consist of two plain tubular portions of different diameters, held in coaxial relationship by a planar annular diaphragm disposed at right angles to the common axis of the tubular portions.

The diameter of the respective plain tubular portions of the known connector are designed to provide an interference fit on the section of the pan or the pipe with which it is to co-operate, so that a sealed connection is established between the pan and the pipe.

In order to achieve an effective seal, it is vital that the connectors allow for a significant variation from the nominal size of the mating section of the pan, such size variation being acknowledged as being unavoidable in the production of pans. However, difficulty is encountered in accommodating these variations in dimensions with the presently known connectors.

A further difficulty arises in known connectors in that distortion resulting from stretching one tubular portion over the mating component, tends to be transmitted to the other tubular portion of the connector by the planar annular diaphragm. This creates a problem in obtaining an effective seal, since the distortion may be such that sealing contact between both tubular portions and the respective mating component cannot be reliably maintained.

Frequently, some degree of misalignment or incorrect registration is found between a pan opening and the corresponding pipe; consequently, in fitting the connector, the tubular portions are forced out of natural coaxial alignment, the resultant distortion being transmitted from one tubular portion to the other by the planar diaphragm. These distortions can be additional to those previously mentioned in connection with the stretching of the tubular portions, and results in further aggravation of sealing problems.

In addition to angular and lateral misalignment, axial movement between the pan and pipe can occur as a result of building mOvement, which can create further sealing problems, and has been known to cause stress relief failure of the sanitary pan.

Furthermore, excessive stretching and distortion in the fitting process may result in either immediate failure of the known connector, or in considerable reduction of its effective life.

The principal object of this invention is to provide an improved connector for toilet pans that will overcome the abovementioned difficulties and disadvantages of existing connectors, is effective in sealing, and simple and economical in both manufacture and installation.

With the above stated principal object in view, there is provided according to the invention a connector for sealably joining the inlet, outlet or vent opening of a toilet pan to a pipe, comprising two tubular portions each adapted to receive at one end in sealing engagement one of the components to be connected, and an integral non-planar diaphragm interconnecting the tubular portions, the tubular portions and diaphragm being composed of resilient material.

The non-planar diaphragm may be in the form of the frustum of a cone, or may be of corrugated or concertina shape in axial cross-section. The two tubular portions are usually coaxial, but may be offset with the axes thereof parallel or slightly inclined.

In one embodiment, the connector is for connecting the outlet pipe to the spigot end of a soil pipe, that is an enlarged end of the soil pipe, having a diameter considerably greater than the diameter of the pan outlet pipe. This difference in diameter enables the two tubular portions of the connector to be disposed one partly at least within the other. In other applications, the outlet pipe and soil pipe are of approximately the same diameter, and thus the integral non-planar diaphragm interconnect the axially outer end of one of the tubular portions and the axially inner end of the other tubular portion.

Preferably, the said one tubular portion is adapted to receive the pan outlet pipe, and the other tubular portion is secured to the soil pipe.

Conveniently, the diaphragm is in the form of two coaxial frustro conical sections, with the smaller end of each joined respective to the tubular portions. The diaphragm may be of a variety of shapes made up of two or more sections having angularly related or curved surfaces in the axial direction.

All embodiments allow a substantial degree of flexing and distortion of the non-planar diaphragm in both the axial and radial directions to accommodate lateral and angular misalignment and/or displacement between the components being connected, without imposing distortion in the tubular portions that would lead to leakage from the joint.

A series of circular serrations or sealing ridges may be formed on the inside face of one or both tubular portions, in the receiving end, to improve the seal. The serrations may be of saw tooth form with the inclined face directed towards the receiving end. The saw tooth form provides a greater resistance to withdrawal of a component from the tubular portion of the connector, than the resistance offered to insertion.

Preferably, one or both of the tubular portions are tapered along their internal surfaces, to improve the capacity of the connector to seal effectively on components within the permitted range of variation from the nominal size.

If desired, a clamping band may also be used to press the tubular portion more firmly onto the component received therein.

The invention will be more fully understood from the following description of some practical arrangements of the connector as illustrated by the accompanying drawings.

In these drawings:

FIG. 4 is a combined elevation and sectional view of another embodiment of a connector.

FIG. 5 is a combined elevation and sectional view of another embodiment of a connector.

FIG. 6 is a combined elevation and sectional view of the connector of FIG. 5 when in position on a pan outlet and soil pipe.

Figure 1:
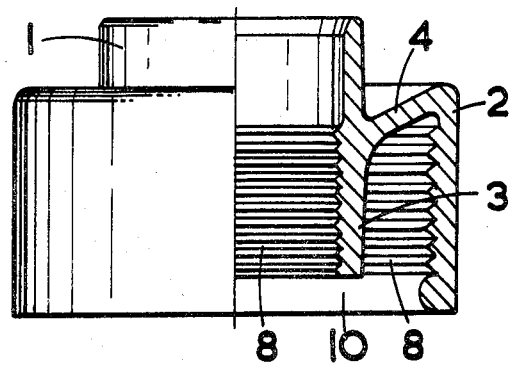
FIG. 1 is a combined elevation and sectional view of one practical arrangement of a connector.

Referring first to FIG. 1, the connector comprises the inner-tubular portion 1 which is coaxial with and extends into one end of the outer-tubular portion 2. The diaphragm 4 is formed integral with the inner and outer tubular portions as a one piece rubber moulding, and extends from a point intermediate the ends of the inner-tubular portion to one end of the outer-tubular portion through which the inner-tubular portion projects. The diaphragm in cross-section is inclined to the axis of the connector so as to be in the form of a truncated cone. The inner-surface of both the inner and outer tubular portions is provided with a series of rings or ridges 8, which provide bands of increased contact pressure when fitted to a pipe, to improve the sealing effect.

Figure 2:
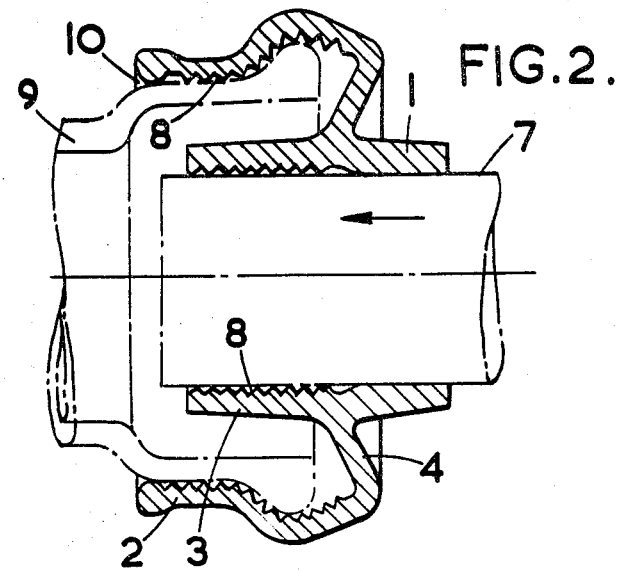
FIG. 2 is a sectional view of the connector shown in FIG. 1 when in position on a pan inlet and flush pipe.

The connector shown in FIG. 1 is particularly suitable for connecting the flushpipe 7 of a cistern to the inlet horn 9 of a toilet pan, as shown in its working position in FIG. 2. It will be noted that, although the outer-tubular portion 2 is considerably distorted by the toilet pan horn 9, this distortion is not transmitted to the inner-tubular portion 2 which receives the flushpipe 7.

Figure 3:
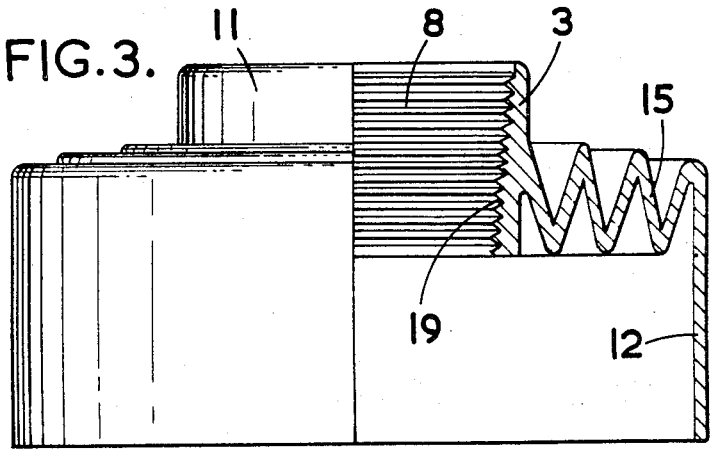
FIG. 3 is a combined elevation and sectional view of another embodiment of a connector.

Referring now to FIG. 3, the inner and outer tubular portions 11 and 12 are connected by the diaphragm 15 which, in cross-section, is of a corrugated or concertina form, with the ridges progressively decreasing in height from the inner to the outer ridge. As in the embodiment shown in FIG. 1, the inner-tubular portion 11 is disposed partly within the outer-tubular portion 12, and the diaphragm 15 extends from an intermediate point on the length of the inner-tubular member 11 to the end of the outer-tubular member. In the embodiment shown in FIG. 3, only the inner-tubular member is provided with ridges 8 on its internal surface, and the internal surface of the inner-tubular member tapers inwardly from the outer end to the inner end as indicated at 19 in FIG. 3. However, if desired, sealing ridges may also be provided on the inner surface of the outer tubular portion.

The connector shown in FIG. 4 is very similar to that shown in FIG. 1, except that the diaphragm 16 extends from the inner end of the inner-tubular member 21, rather than from a point intermediate its length. Again the connector is provided with ridges on the internal surface of both tubular portions 21 and 22, but in this particular embodiment, the axial spacing of the ridges is considerably greater than the ridges shown in FIG. 1. The spacing of the ridges may correspond to the spacing of the annular grooves normally provided on the external surface of a toilet pan outlet pipe. The outwardly tapered lead-in mouth 20 is provided on the outer-tubular portion to facilitate fitment of the connector to a soil pipe.

The embodiments shown in FIGS. 3 and 4 are particularly suitable for connecting the toilet pan outlet to a soil pipe.

Another connector also suitable for forming the necessary seal connection between the outlet pipe and the soil pipe, is shown in FIG. 5 and this connector is particularly advantageous because of its relatively short axial length, and in that it permits the pan outlet pipe to extend axially into the mouth of the soil pipe. The inner and outer tubular portions 31 and 32 are disposed in concentric relation and joined at one end by the diaphragm 27 of V-shaped section. The ends of the inner and outer tubular portions joined with the ends of the respective arms of the V-shaped diaphragm. Again ridges 8 are provided on the internal surface of the inner and outer tubular portions, and in its free state, the end 29 of the inner tubular member 31 is reduced in diameter so as to increase the contact pressure in that area when the outlet pipe is fitted into the tubular member as shown in FIG. 6. It will also be noted from FIG. 6 that a metal band 24 may be clamped around the outer-tubular portion to compress it onto the end of the soil pipe 25.

Figure 7:
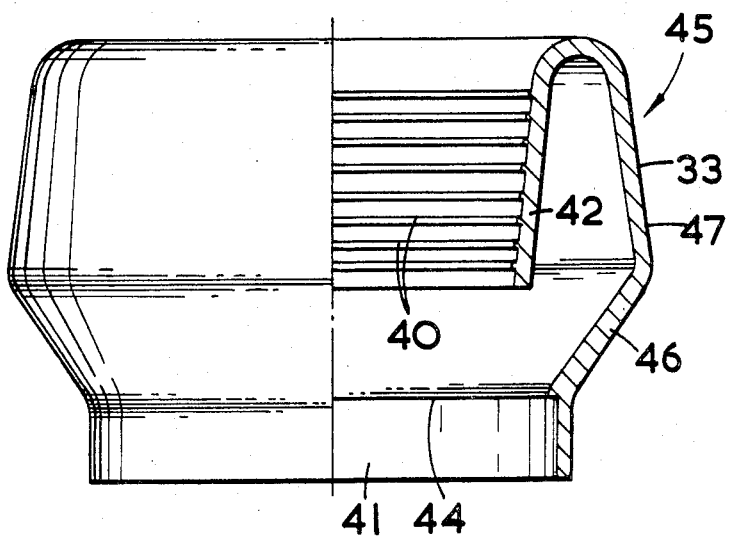
FIG. 7 is a combined elevation and sectional view of a modification of the embodiment in FIG. 5.

The connector shown in FIG. 7 has the two tubular portions 41 and 42 axially spaced one from the other. The diaphragm 45 when viewed in cross-section comprises two truncated conical sections 46 and 47 with a common base. The section 46 is joined at the smaller end to the axially inner end of the tubular portion 41 and the small end of the other section 47 is joined to the axially outer end of the tubular portion 42. Thus, the tubular portion 42 is completely enclosed within the diaphragm 45. In use, the toilet pan outlet pipe is received in tubular portion 42 and the tubular portion 41 receives the end of the soil pipe.

The flexibility of the connector, and hence its ability to accommodate misalignment and movement is increased by the smooth curve form of the junction of the frustro conical section 47 with the outer end of the tubular portion 42. The thickness of the diaphragm may be reduced, and internal ribs provided in the area of the junction of the two frustro conical sections 46 and 47 as a means of saving material.

The tubular portion 42 which receives the pan outlet pipe is tapered from the outer to the inner end, and provided with annular rings 40 to increase the contact pressure on the pipe and hence improve the seal obtained. The shoulder 44 is provided to limit the distance the soil pipe extends into the tubular portion 41.

The advantage of this construction is that the connector can fit onto the end of the plain piece of soil pipe, and it is not necessAry for the soil pipe to have the conventional enlarged end. Preferably the band, similar to the band 24 in FIG. 6, is provided to clamp the connector to the soil pipe, but this band may be dispensed with if the tubular portion 41 is of sufficient length to frictionally grip the soil pipe, without fear of parting in service.

Figure 8:
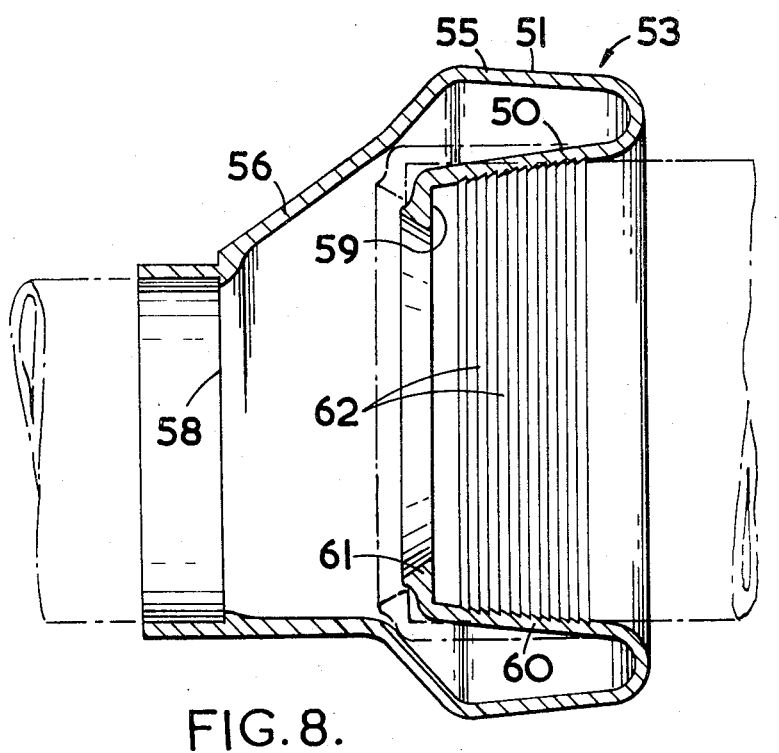
FIG. 8 is a combined elevation and sectional view of a further modification of the connector shown in FIG. 7.

FIG. 8 shows a further modification of the connector shown in FIG. 7 particularly for use in connecting a horizontal pan outlet to a horizontal soil pipe. In this form of connection, some authorities controlling sewerage installations require that the lowest portion of the soil pipe and pan outlet be on approximately the same level. Thus when connecting a pan outlet to a soil pipe of smaller diameter, it is necessary for the two tubular portions of the connector to have these axes offset by an amount equal to half the difference in internal diameter of the pipe and outlet.

The inner and outer tubular portions 50 and 51 and the diaphragm 53 are of generally the same construction as that shown in FIG. 7.

The section 55 of the diaphragm is of a truncated conical shape, but the section 56 is non-symmetrical in order to merge smoothly with two eccentric portions.

The tubular portion 51 has an internal shoulder 58 to limit the extent of insertion of the soil pipe and the tubular portion 50 has a similar shoulder 59. The inturned flange portion 61 defining the shoulder 59 has a truncated conical surface 60 directed towards the tubular portion 51 and, when a pan outlet pipe is inserted into the tubular portion 50, the resultant expansion thereof may bring the flange portion 61 into contact with the inner surface of the diaphragm. This prevents soil material being trapped in the area between the inner tubular portion 50 and the diaphragm.

The tubular portion 50 is provided with internal ridges 62, which perform the same function as the ridges 8 previously described. However, the ridges 62 are of saw tooth shape with the inclined faces directed towards the entry end of the tubular portion 52. The saw tooth shape results in the ridges offering greater resistance to withdrawal of the pan outlet than is offered to the entry thereof. This saw tooth shape of ridge may be substituted for the other forms of ridge in any of the embodiments of the invention described.

It is to be noted that the connector shown in FIG. 8 is installed so that the lowermost portion of the soil pipe and pan outlet are in substantial alignment, this is with the axis of tubular portion 51 being vertically below the axis of tubular portion 50.

I claim:

1. A connector for sealably joining the inlet, outlet or vent opening of a toilet pan to a pipe, comprising large and small tubular portions disposed with their axes substantially parallel and in which said small tubular portion, at least partially, extends into said large tubular portion, each adapted to receive at one end, in female sealing engagement, one of the components to be connected, and an integral diaphragm interconnecting said tubular portions and extending from the inner one of said tubular portions intermediate its ends to one end of the outer of said tubular portions, said tubular portions and diaphragm being composed of resilient material and said diaphragm being sufficiently flexible to accommodate misalignment of said components.

2. A connector for sealably joining the inlet, outlet or vent opening of a toilet pan to a pipe, comprising, large and small tubular portions disposed with their axes substantially parallel and in which said small tubular portion, at least partially, extends into said large tubular portion, each adapted to receive at one end, in female sealing engagement, one of the components to be connected, and an integral non-planer diaphragm interconnecting the tubular portions and extending from one end of the outer one of said tubular portions to the inner end of the inner one of said tubular portions, said tubular portions and diaphragm being composed of resilient material and said diaphragm being sufficiently flexible to accommodate misalignment of said components.

3. A connector for sealably connecting the outlet of a toilet pan to a soil pipe, comprising, large and small tubular portions axially spaced one from the other, the axially outer ends being adapted to receive, in female sealing engagement, the pan outlet and soil pipe respectively, and an integral diaphragm interconnecting the axially outer end of one of said tubular portions and the axially inner end of the other tubular portion and in the form of two coaxial, truncated conical sections with the smaller end of each joined to the respective tubular portions, said tubular portions and said diaphragm being composed of resilient material and said diaphragm being sufficiently flexible to accommodate misalignment of said components.

4. A connector in accordance with claim 2 wherein the diaphragm is a V-shaped cross-section with the ends of the arms of the V joining the tubular portions.

* * * * *